March 13, 1951  O. G. QUAM  2,544,859
ILLUMINATING AND MAGNIFYING MAP HOLDER
Filed May 10, 1948  2 Sheets-Sheet 1
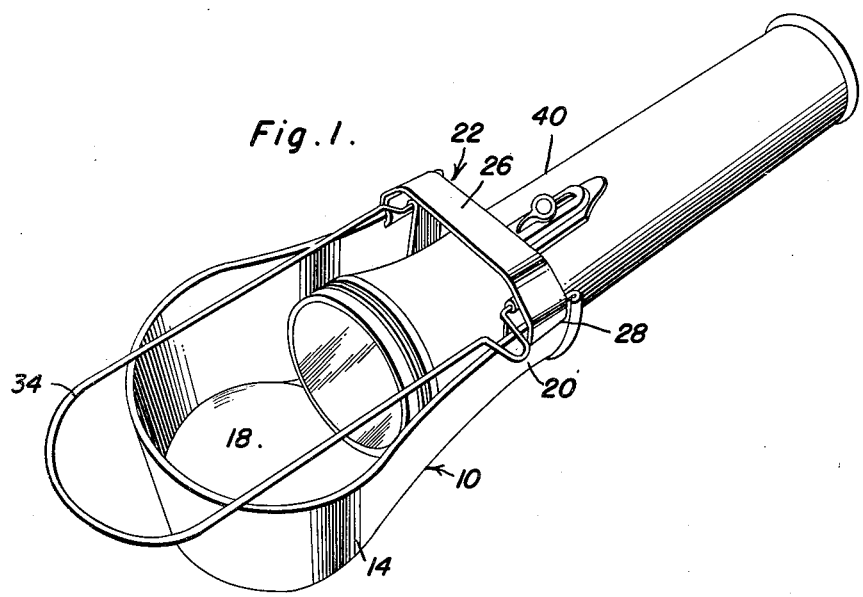
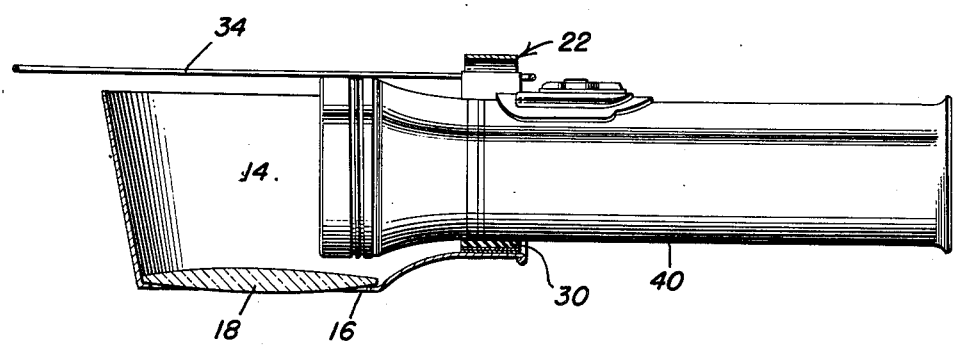
Inventor
Obert G. Quam
By Clarence A. O'Brien
and Harvey B. Jacobson
Attorneys March 13, 1951     O. G. QUAM     2,544,859
ILLUMINATING AND MAGNIFYING MAP HOLDER
Filed May 10, 1948     2 Sheets-Sheet 2

Inventor
Obert G. Quam
Attorneys

Patented Mar. 13, 1951

2,544,859

UNITED STATES PATENT OFFICE 2,544,859

ILLUMINATING AND MAGNIFYING MAP HOLDER

Obert G. Quam, Marshalltown, Iowa

Application May 10, 1948, Serial No. 26,103

1 Claim. (Cl. 88—39)

This invention relates to novel and useful improvements in map holders and has for its primary object to provide a convenient device for holding a road map and for enabling the map to be easily read and interpreted.

Another object of this invention is to provide a compact and simple device, which in association with an ordinary conventional flashlight will enable a traveler or tourist to conveniently and easily read a road map at night time.

Another object of this invention is to provide a compact map holding device, that will hold a map, illuminate the map and magnify the inscriptions thereon, the same being small and compact and capable of being moved and handed freely about to occupants of a tourist automobile.

A meritorious feature of this invention resides in the provision of a holder, having a magnifying lens positioned therein, the holder adapted to retain in clamped placement a flashlight, so that the ray from the light will be cast indirectly upon the magnifying lens.

Another meritorious feature of this invention resides in the provision of a clip disposed on the holder in opposed placement from the magnifying lens and adapted to detachably receive and retain a map or any other or similar type of printed material, so that a person can easily and properly view the printed material through the magnifying lens, without any need for focusing and positioning the lens and without annoyance from shadows and uneven distribution of light on the printed material.

These and ancillary objects and other meritorious features are attained by this invention, a preferred embodiment of which is set forth in the following description and illustrated in the accompanying drawings, wherein:

Figure 1 is a view in perspective of this invention showing the same in operative association with a flashlight, the latter provided with a means for supplying illumination;

Figure 2 is a vertical sectional view of this invention, showing a conventional flashlight in side elevational view and in association with the holder;

Figure 3:
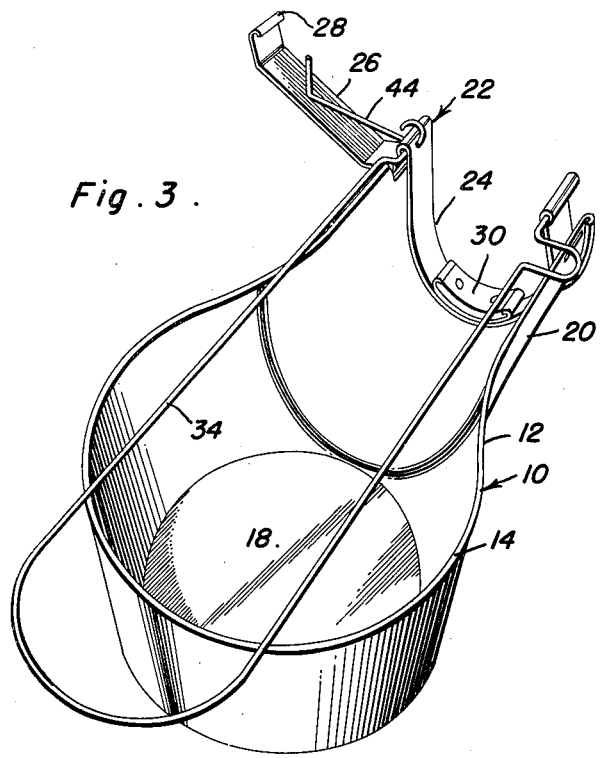
Figure 3 is a view in perspective of this invention.
Figure 4:
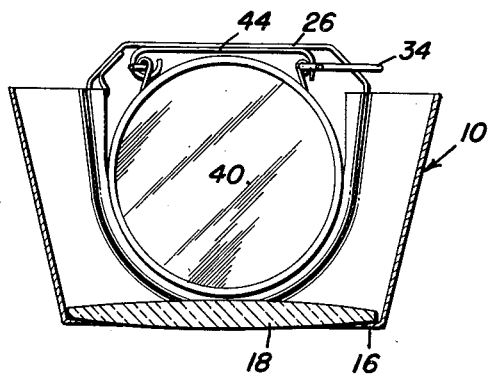
Figure 4 is a cross sectional view taken on a transverse line through the main portion of the holder.
Figure 5:
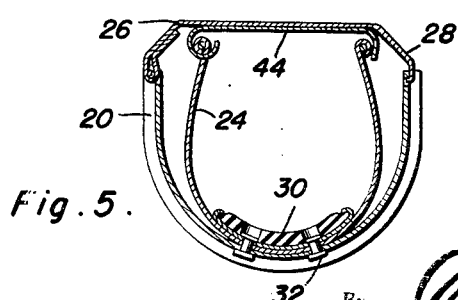
Figure 5 is a vertical sectional view taken on a transverse plane, substantially through the open or clamping end of the holder.

Referring now more particularly to the drawings, wherein similar characters of reference designate corresponding parts throughout, this invention is generally designated by the character reference 10, and comprises a body portion 12. The body portion 12 consists of a substantially truncated conical shaped portion 14, having an open top and bottom portion. The bottom or inwardly inclined portion 16 is defined by an annular rim projecting laterally from the prime side walls, upon which is securely seated a magnifying lens 18. A portion of the side wall is outwardly flared in a U-shaped supporting and handle portion 20, which extends integrally with the truncated conical section 14 and flares evenly therefrom. The U-shaped portion 20 is adapted to serve as a handle and as a support means for a conventional flashlight 40, as seen in Figures 1 and 2 of the drawings.

Of course, suitable means is provided for securing or clamping the flashlight to the holder, with the lens portion of the flashlight resting perpendicularly on the inner portion of the magnifying glass and adapted to cast its rays directly against the side walls so as to bear indirectly upon the magnifying lens. The means preferred comprises a clamp assembly 22, which is formed at the open extending end of the U-shaped portion 20. The clamp 22 comprises a substantially U-shaped section 24, which is suitably secured within the supporting section 20 adjacent the immediate end thereof. The ends of the clamping section 24, which may be made of any suitable material, such as spring steel or the like, are bent or coiled upon themselves. The clamping arm 26 is swingably mounted on one side of the section 20 adjacent the beaded or crimped end and has a latch end 28 formed on the free extremity thereof, which is adapted to engage the opposing coil or bent end of the section 24. A spring 44, having one end anchored to the section 24 has its opposite end engaged on the inner surface of the clamping arm 26 and is adapted to encourage and retain the swinging arm relative to an open and unlatched position. A cushioning and retaining element 30 is secured in the medial portion of the U-shaped secured bar 24 and may be formed from any suitable material, such as rubber or the like cushioning material. The section 30 is secured to the bar 24 and the extending end section 20 by means of rivets 32, so that the flashlight 40 is securely and noninjuriously received and retained in the clamp neck of the section 20, defined by the clamp 22.

Of course, suitable means is provided for detachably receiving and retaining a road map or other printed material on the holder 10, on the bottom portion opposite the magnifying lens 18. The means may comprise any suitable type of spring clip or the like restraining and retaining device. However, it has been found advisable to employ a spring clip 34, having a substantially elongated U-shaped configuration. The clip 34 has its opposed terminating ends securely received within the coiled or bent terminating portions of the bar 24, as seen in Figure 3. The closed or rounded end of the clip projects substantially beyond the truncated conical body portion 14 and serves in association with the bottom portions of the side walls to retain a map or the like thereon.

Thus, it can be seen that a conventional flashlight 40 may be easily and conveniently positioned on the cushioning element 30 within the clamping neck of the section 20 and securely retained therein by means of the latching arm 26 in association with the clamping section 24. Printed material may be secured by the clip 34 in opposement to the magnifying lens 18 and illumination from the flashlight 40 will enable a person to easily read the small print and follow the small road sections. Of course, a decided advantage can be appreciated in the fact that the holder may be easily moved laterally over the surface of the map or printed material and thus enable a person to follow the path of the various roads and highways printed thereon.

Thus, it can be seen that there is provided a convenient and useful device, especially adapted and of desirable utility for use in traveling. The compactness and simpleness of the device lends itself readily to use and obviates many inconveniences otherwise attended with conventional traveling in automobiles.

However, since many other purposes and objects of this invention will become apparent to those skilled in the art, upon a perusal of the foregoing description and the accompanying drawings, in view of the novelty and simplicity of the device, it will be understood that certain changes may be effected thereon, as coming within the spirit of the invention and the scope of the appended claim.

Having described the invention, what is claimed as new is:

A reading device comprising a U-shaped cradle having a web portion and upstanding side walls, a U-shaped body extending outwardly from a terminal edge of said U-shaped cradle defining a prolongation thereof, the axis of said body being at substantially a right angle with respect to the axis of said cradle, the lower edge of said U-shaped body being formed with an inwardly extending flange, a U-shaped strap fixed to the opposing ends of the side walls for receiving a flash light with the lens end thereof disposed within the body, a locking member hingedly carried by the strap and lockingly engageable therewith to clamp the flash light in the cradle, a clamping member supported by the strap and engageable on one edge of the body for clamping reading matter thereon and a magnifying lens supported on said inwardly extending flange.

OBERT G. QUAM.

REFERENCES CITED

The following references are of record in the file of this patent:

UNITED STATES PATENTS

| Number | Name | Date |
|---|---|---|
| 1,167,266 | Bua | Jan. 4, 1916 |
| 1,291,710 | Arter | Jan. 21, 1919 |
| 1,729,660 | Farmer | Oct. 1, 1929 |
| 1,993,589 | Borden | Mar. 5, 1935 |
| 2,387,306 | Stapleton | Oct. 23, 1945 |
| 2,395,760 | Quan | Feb. 26, 1946 |

FOREIGN PATENTS

| Number | Country | Date |
|---|---|---|
| 287,015 | Great Britain | Mar. 15, 1928 |